(12) United States Patent
Suzuki

(10) Patent No.: US 10,303,261 B2
(45) Date of Patent: May 28, 2019

(54) DISPLAY SYSTEM

(71) Applicant: TOYOTA JIDOSHA KABUSHIKI KAISHA, Toyota-shi, Aichi-ken (JP)

(72) Inventor: Youta Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 15/792,210

(22) Filed: Oct. 24, 2017

(65) Prior Publication Data

US 2018/0150142 A1   May 31, 2018

(30) Foreign Application Priority Data

Nov. 25, 2016   (JP) .................. 2016-229530

(51) Int. Cl.
*G06F 3/02* (2006.01)
*G09G 3/20* (2006.01)

(52) U.S. Cl.
CPC ......... *G06F 3/0227* (2013.01); *G09G 3/2096* (2013.01); *G09G 2354/00* (2013.01); *G09G 2360/10* (2013.01); *G09G 2370/20* (2013.01); *G09G 2370/22* (2013.01); *G09G 2370/24* (2013.01); *G09G 2380/10* (2013.01)

(58) Field of Classification Search
CPC ................ G06F 3/0227; G09G 3/2096; G09G 2370/24; G09G 2370/22; G09G 2380/10; G09G 2360/10; G09G 2354/00; G09G 2370/20

See application file for complete search history.

(56) References Cited

FOREIGN PATENT DOCUMENTS

JP          2000-353357 A       12/2000

*Primary Examiner* — Abhishek Sarma
(74) *Attorney, Agent, or Firm* — Oliff PLC

(57) ABSTRACT

A display system includes a display device configured to display a screen; and a plurality of ECUs connected to a communication network. The ECUs include a first ECU and a second ECU. The first ECU is configured to perform determination regarding whether operation information when the first ECU makes a screen he displayed is a processing target, in a case where the operation information is not a processing target of the first ECU, set a transmission destination of notification in processing after the determination to a second ECU and include the operation information in the notification, and for the operation information when the second ECU makes the screen he displayed, transmit the operation information to the second ECU before the determination is performed. The second ECU is configured to perform the determination and the processing after the determination on the operation information received from the first ECU.

7 Claims, 8 Drawing Sheets

DISPLAY SYSTEM

INCORPORATION BY REFERENCE

The disclosure of Japanese Patent Application No. 2016-229530 filed on Nov. 25, 2016 including the specification, drawings and abstract is incorporated herein by reference in its entirety.

BACKGROUND

1. Technical Field

The present disclosure relates to a display system in which a plurality of control devices makes screens be displayed.

2. Description of Related Art

An information processing apparatus that generates an event according to an operation on an input device and performs processing of the event is known. The information processing apparatus includes a conversion table in which operations and events are associated with each other, and generates an event associated with an operation (for example, see Japanese Unexamined Patent Application Publication No. 2000-353357).

SUMMARY

In a display system in which a plurality of control devices makes screens be displayed, the types of operations on a screen, such as a press method of a switch, a trigger method, the types of switches, and combinations thereof, vary for each screen. Then, in a case where one control device that receives information of an operation manages all information of an operation on each screen, a command destination of processing based on information of an operation, and the like, a load of processing is concentrated on the control device.

The disclosure provides a display system in which a plurality of control devices makes screens be displayed, having an advantage of suppressing concentration on a specific control device of processing operation information.

A display system according to an aspect of the disclosure includes a display device configured to display a screen, and a plurality of electronic control units connected to a communication network. The electronic control units are configured to make the display device display the screen, and include a first electronic control unit and a second electronic control unit. Each of the electronic control units is configured to perform determination regarding whether or not operation information about the screen is a processing target of the electronic control unit, when the operation information is a processing target, perform control based on the operation information, and when the operation information is not a processing target, transmit, to other electronic control units, notification that the operation information is not a processing target as processing after the determination. The first electronic control unit is configured to acquire operation information on the screen, perform the determination on the operation information when the first electronic control unit makes the screen be displayed, in a case where the operation information is not a processing target of the first electronic control unit, set a transmission destination of the notification in the processing after the determination to the second electronic control unit and include the operation information in the notification, and when the second electronic control unit makes the screen be displayed, transmit the operation information to the second electronic control unit before the determination is performed. The second electronic control unit is configured to perform the determination and the processing after the determination on the operation information received from the first electronic control unit.

According to the aspect of the disclosure, a electronic control unit that makes the display device display a screen performs determination regarding whether or not the operation information is a processing target thereof, with priority over other electronic control units. As a result, since the determination is performed by an electronic control unit that is relatively highly likely to be a processing target of the operation information, it is possible to easily specify a processing destination of the operation information from among a plurality of electronic control units, and to suppress concentration on a specific electronic control unit of processing for determining an electronic control unit that has the operation information as the processing target.

In the display system according to the aspect of the disclosure, the second electronic control unit may be configured to set the transmission destination of the notification in the processing after the determination to the first electronic control unit. The first electronic control unit may be configured to, when the notification is received from the second electronic control unit, perform the determination and the processing after the determination on the operation information transmitted before the determination is performed.

According to the aspect of the disclosure, for the operation information when the second electronic control unit makes the screen be displayed, in a case where the operation information is not a processing target of the second electronic control unit, it is possible to determine in the first electronic control unit whether or not the operation information is a processing target thereof.

In the display system according to the aspect of the disclosure, the second electronic control unit may be configured to perform the determination on the operation information transmitted before the first electronic control unit performs the determination, when the operation information is not a processing target of the second electronic control unit, set the transmission destination of the notification in the processing after the determination to the first electronic control unit, and transmit the operation information included in the notification to the first electronic control unit.

According to the aspect of the disclosure, in a case where the notification is received from the second electronic control unit, the first electronic control unit can receive the operation information to he a determination target in the first electronic control unit from the second electronic control unit. For this reason, the first electronic control unit can reduce a load of the first electronic control unit separately managing the operation information that the second electronic control unit determines as not being a processing target, that is, the operation information transmitted before the first electronic control unit performs the determination.

In the display system according to the aspect of the disclosure, the electronic control units may include the first electronic control unit and a plurality of second electronic control units. An order of transmission of the notification may he set in advance to each of the electronic control units. The notification in the processing after the determination including the operation information may be transmitted, according to the order, to the electronic control units other than the electronic control unit that makes the screen be displayed.

According to the aspect of the disclosure, the acquired operation information of the first electronic control unit is transmitted to each of the electronic control units in order according to the order set in advance. Then, in each of the electronic control units, the determination regarding whether or not the operation information is a processing target thereof is performed in order according to the order set in advance. For this reason, even in a configuration in which the second electronic control units are provided, it is possible to obtain the above-described effects, and to increase the speed of processing for determining an electronic control unit that has the operation information as the processing target.

In the display system according to the aspect of the disclosure, the first electronic control unit may be configured to generate a plurality of events upon reception of a result of an operation on the screen from an input device and handle each event as the operation information.

According to the aspect of the disclosure, it is possible to generate a plurality of events to be handled as operation information based on a result of an operation input from the input device. For example, it is possible to generate an event accompanied with each press method of a switch, an event accompanied with each trigger method, or the like based on a single switch operation. As a result, it becomes easy to cope with the expansion of a variety of operations on a screen.

In the display system according to the aspect of the disclosure, an input device that is provided to input the operation information may be a switch.

In the display system according to the aspect of the disclosure, the first electronic control unit may be configured to generate an event according to a length of a time for pressing the switch.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
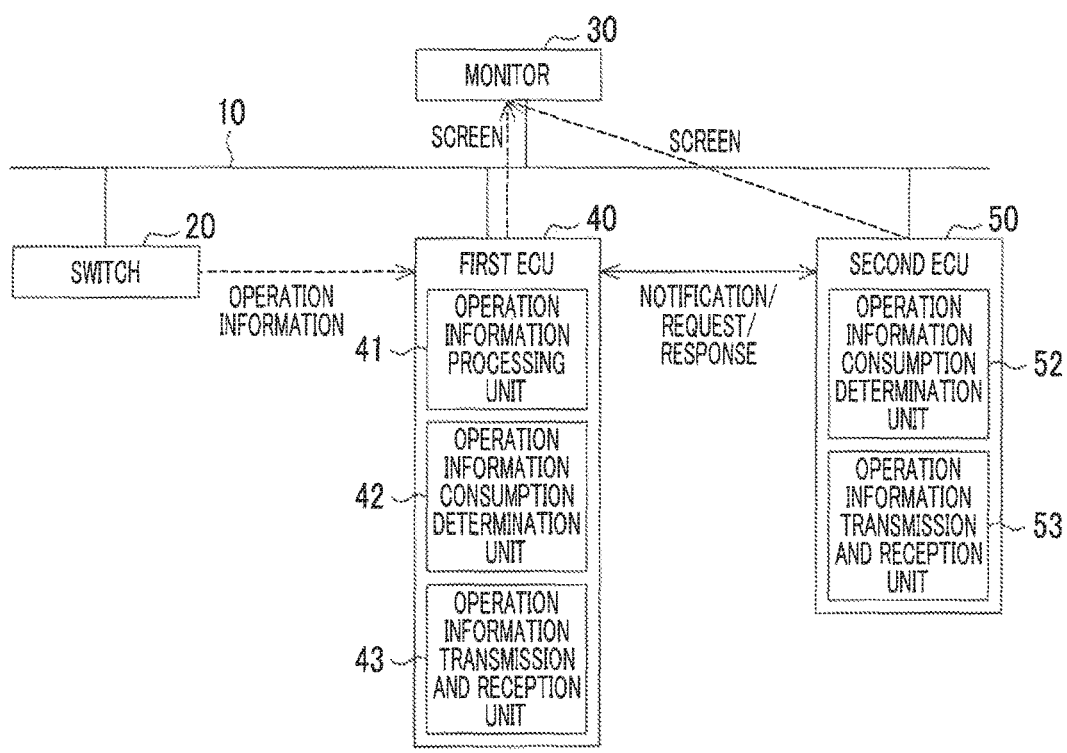
FIG. 1 is a block diagram showing the schematic configuration of an embodiment in which a display system is embodied.

An embodiment in which a display system is embodied will be described referring to FIG. 1. The display system of the embodiment includes a communication system including an in-vehicle network mounted in a vehicle. First, the outline of the display system will be described referring to FIG. 1.

The communication system in the display system includes a first electronic control unit (ECU) 40 and a second electronic control unit (ECU) 50. The communication system includes a switch 20 as an example of an input device that is provided to input operation information. In addition, the communication system includes a monitor 30 as an example of a display device that displays a screen including video in a display area.

The first ECU 40 and the second ECU 50 make screens transmitted from the first ECU 40 and the second ECU 50 be displayed in the display area of the monitor 30. The switch 20 is configured to be switched on and off by an operation of a driver or the like. The switch 20 transmits operation information. The operation information is information corresponding to an operation on the switch 20, and is information indicating that the switch 20 is switched on, the switch 20 is on, the switch 20 is switched off, the switch 20 is off, or the like.

The first ECU 40 inputs the operation information from an output of the switch 20. The first ECU 40 determines priority. The priority determined by the first ECU 40 is an order in which the operation information is allocated to the first ECU 40 and the second ECU 50. A result of the determination of the priority performed by the first ECU 40 is based on which of the first ECU 40 and the second ECU 50 is an ECU that makes the screen be displayed in the display area of the monitor 30.

For example, in a case where the first ECU 40 makes the monitor 30 display a screen, the priority of the first ECU 40 is the first, the priority of the second ECU 50 is the second, and the operation information is first allocated to the first ECU 40 out of the first ECU 40 and the second ECU 50. In a case where the second ECU 50 makes the monitor 30 display a screen, the priority of the first ECU 40 is the second, the priority of the second ECU 50 is the first, and the operation information is first allocated to the second ECU 50 out of the first ECU 40 and the second ECU 50. The first and second ECUs 40, 50 perform consumption determination of the operation information input to the first ECU 40 and the second ECU 50. Each of the first ECU 40 and the second ECU 50 transfers the operation information to another ECU under a condition according to the priority of the first ECU 40 and the second ECU 50.

The operation information is an event that is generated based on an operation of a driver or the like on the switch 20. The generated event disappears, that is, is consumed in a stage where the generated event is initially used in a program that handles a screen. The generated event is transferred to the first ECU 40 and the second ECU 50 according to the order of priority until determination is made that the generated event is used in software. The generated event disappears without being used in both of the ECUs 40, 50, to which the generated event is transferred, in a case where determination is made that the generated event is not used in software.

Next, the details of the display system will be described referring to FIG. 1. The communication system in the display system includes a communication bus 10 for an in-vehicle network. The switch 20, the monitor 30, the first ECU 40, and the second ECU 50 are communicably connected to the communication bus 10.

The switch 20 is operated by the driver or the like. The switch 20 transmits a result of an operation on the switch 20. The monitor 30 includes a display area where a screen including video is displayable. The monitor 30 displays a screen received through the communication bus 10 in the display area. The first and second ECUs 40, 50 receive the result of the operation through the communication bus 10. The first ECU 40 and the second ECU 50 generate screens that are displayed on the monitor 30. The first ECU 40 and the second ECU 50 transmit the screens through the communication bus 10. The first ECU 40 and the second ECU 50 can perform transmission and reception of various communication messages with each other through the communication bus 10. The first ECU 40 and the second ECU 50 can perform transmission and reception of various communication messages with other ECUs than the two ECUs 40, 50.

The communication system employs, for example, a controller area network (CAN) protocol as a communication protocol. The communication system may include wireless communication in a part of a communication path, or may include a path through another network through a gateway or the like.

In the CAN protocol, a frame that is a structure of a communication message is specified. The frame that is specified in the CAN protocol includes a storage area of a "message ID" as an identifier indicating the type of communication message, a "data field" that is a storage area of "message data" that is data designated by a user, and the like. The "message ID" is determined to a specific value for each type of communication message. The first ECU 40 and the second ECU 50 give, to the communication messages transmitted from the first ECU 40 and the second ECU 50, the "message IDs" corresponding to the types of the communication messages, transmit the communication messages, and determine the types of the communication messages received by the first ECU 40 and the second ECU 50 based on the "message IDs". In the communication system, an ECU that can give the "message ID" to the communication message and transmit the communication message is one for each "message ID", and is unique to each "message ID". The "data field" that is an area where "message data" is stored has any length of 0 to 64 bits (0 to 8 bytes).

Each of the first ECU 40 and the second ECU 50 includes a microcomputer having an arithmetic device (CPU) and a storage device. Each of the first ECU 40 and the second ECU 50 includes an arithmetic device that executes arithmetic operation processing of a program, a read only memory (ROM that stores the program, data, and the like, and a volatile memory (RAM) that temporarily stores an arithmetic operation result of the arithmetic device. Each of the first ECU 40 and the second ECU 50 includes a backup memory that stores a set value or an arithmetic operation value, and a storage device, such as a flash memory, that stores data. Each of the first ECU 40 and the second ECU 50 reads the program stored in the storage device on the arithmetic device and the arithmetic device executes the read program to realize a predetermined function. For example, each of the first ECU 40 and the second ECU 50 performs processing for generating screens, processing for transmitting the screens, and processing for acquiring the operation information.

In a case where the first ECU 40 transmits the screen, the first ECU 40 notifies the second ECU 50 that the screen is transmitted from the first ECU 40. In a case where the second ECU 50 transmits the screen, the second ECU 50 notifies the first ECU 40 that the screen is transmitted from the second ECU 50. The latest screen is displayed in the display area of the monitor 30. When the screen is displayed, the first ECU 40 stops the transmission of the screen from the first ECU 40 with the second ECU 50 receiving the notification indicating that the screen is transmitted from the first ECU 40. When the screen is displayed, the second ECU 50 stops the transmission of the screen from the second ECU 50 with the first ECU 40 receiving the notification indicating that the screen is transmitted from the second ECU 50. The monitor 30 displays one of the screens transmitted from the first ECU 40 and the screen transmitted from the second ECU 50. Then, when the switch 20 transmits the result of the operation, the operation information is allocated to an ECU that makes the monitor 30 display the screen, with priority over another ECU.

Each of the first ECU 40 and the second ECU 50 includes a communication I/F for a CAN protocol, a plurality of message boxes (MBOX) that temporarily stores the communication messages, and the like. Each of the first ECU 40 and the second ECU 50 performs transmission and reception of the communication message through the communication I/F or the MBOX. The first ECU 40 and the second ECU 50 respectively include operation information consumption determination units 42, 52 that determine consumption of the operation information, and operation information transmission and reception units 43, 53 that perform processing for transmitting and receiving the operation information through the communication messages.

The first ECU 40 includes an operation information processing unit 41. The operation information processing unit 41 performs processing for receiving the result of the operation transmitted from the switch 20, processing for acquiring the operation information from the received result of the operation, and processing for transmitting the operation information to the second ECU 50 according to the priority at this time. The functions of the operation information processing unit 41, the operation information consumption determination units 42, 52, and the operation information transmission and reception units 43, 53 are realized by arithmetic operation processing of a program in the first ECU 40 and the second ECU 50.

Figure 2:
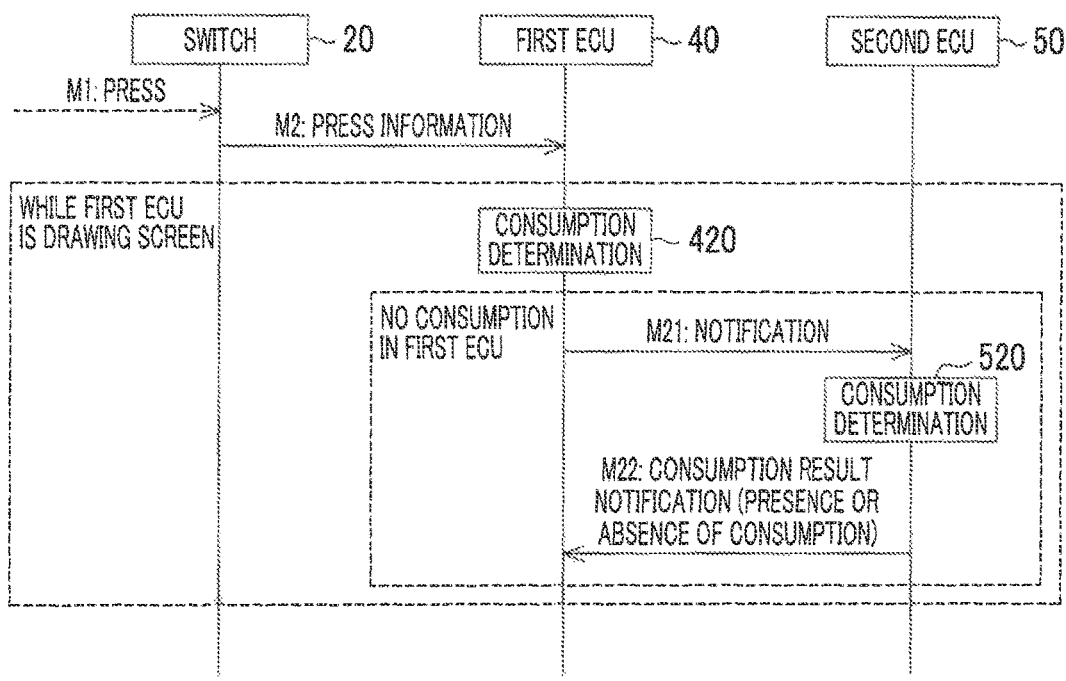
FIG. 2 is a sequence diagram showing an example where consumption determination of an event is performed from a first ECU.

The outline of processing for determining consumption of an event generated with an operation of the switch 20 will be described referring to FIG. 2. First, a case where the priority of determination of the use of the operation information is set in an order in which the first priority is the first ECU 40 and the second priority is the second ECU 50 will be described as an example. The operation information is transferred to the program as an event converted by the operation information processing unit 41 of the first ECU 40.

In a case where a press M1 of the switch 20 is performed by the driver, the switch 20 transmits press information M2 as information corresponding to the performed press M1. The transmitted press information M2 is received by the first ECU 40. The first ECU 40 generates an event corresponding to the press of the switch 20 from the press information M2 received by the first ECU 40. The first ECU 40 performs, as consumption determination 420, determination regarding whether or not the event generated by the first ECU 40 is used in a program that is executed by the first ECU 40 and handles a screen. In the consumption determination 420, in a case where the generated event is used in the program, the first ECU 40 determines that the event is consumed, and in a case where the event is not used in the program, the first ECU 40 determines that the event is not consumed. The consumed event disappears when the event is consumed, and the unconsumed event is transferred to the second ECU 50 that has priority next to the first ECU 40. That is, in a case where determination is made that the event is not consumed, the first ECU 40 transmits notification M21 including the event to the second ECU 50.

The second ECU 50 receives the notification M21 transmitted from the first ECU 40. The second ECU 50 acquires the event corresponding to the press of the switch 20 from the notification M21 received by the second ECU 50. The second ECU 50 performs, as consumption determination 520, determination regarding whether or not the event acquired by the second ECU 50 is used in a program that is executed by the second ECU 50 and handles a screen. In the consumption determination 520, in a case where the acquired event is used in the program, the second ECU 50 determines that the event is consumed, and in a case where the event is not used in the program, the second ECU 50 determines that the event is not consumed. The second ECU 50 transmits, to the first ECU 40, a result of the determination regarding whether or not the event is consumed, as consumption result notification M22. The consumed event disappears when the event is consumed. The unconsumed event is returned from the second ECU 50 to the first ECU 40. The second ECU 50 transmits the unconsumed event to the first ECU 40 along with the consumption result notification M22 in order to return the unconsumed event to the first ECU 40. A configuration may be made in which other ECUs than the first ECU 40 and the second ECU 50 are given priority, and an unconsumed event is transferred to another ECU that has priority next to the second ECU 50.

Figure 3A:
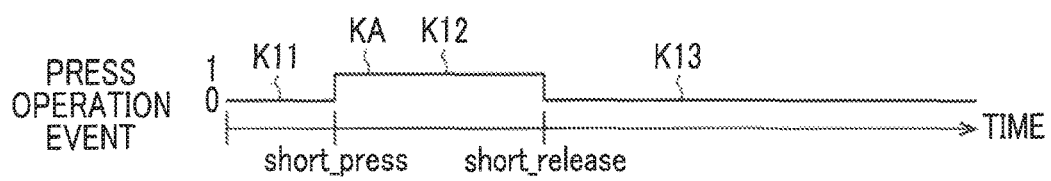
FIG. 3A is a diagram showing the details of an event in the embodimentin the form of a time chart, and a diagram showing a command that is detected by short press.
Figure 3B:
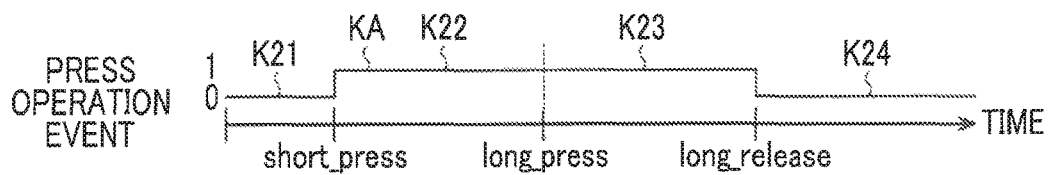
FIG. 3B is a diagram showing the details of an event in the embodiment in the form of a time chart, and a diagram showing a command that is detected by long press.

Next, as an example of an event that is generated from an operation of the switch 20, events that are generated by "short press" and "long press" will be described referring to FIGS. 3A and 3B. FIG. 3A shows an event that is generated by "short press", and FIG. 3B shows an event that is generated by "long press". Both of "short press" and "long press" are the press of the switch 20. An event that is generated by the press of the switch 20 is one of an event that is generated by "short press" and an event that is generated by "long press". The event that is generated by "short press" and the event that is generated by "long press" are generated separately based on comparison of duration of the press of the switch 20 with a predetermined threshold.

Specifically, the event that is generated by "short press" is an event that is generated in a case where the switch 20 is opened (off) until the duration of the press (on) is less than the predetermined threshold, that is, becomes the predetermined threshold. The event that is generated by "long press" is an event that is generated in a case where the duration of the press (on) is equal to or greater than the predetermined threshold. The length of the time that is the predetermined threshold is the same as the length of the time of an event "short_press" to an event "long_press". The first ECU 40 receives the press information M2 and performs processing for generating an event according to an operation of the switch 20 in the operation information processing unit 41 based on the press information M2.

As shown in FIG. 3A, the operation information processing unit 41 of the first ECU 40 generates two events "short_press" and "short_release" with "short press" in this order. First, the operation information processing unit 41 monitors a state KA of the switch 20, and generates the event "short_press" with acquisition of information indicating that the switch 20 is pressed (on). Then, the operation information processing unit 41 generates the event "short_release" with acquisition of information indicating that the switch 20 is opened (off) for a time length less than the predetermined threshold from when the switch 20 is pressed (on).

As shown in FIG. 3B, the operation information processing unit 41 of the first ECU 40 generates three events "short_press", "long_press", and "long_release" with "long press" in this order. First, as in the case of "short press", the operation information processing unit 41 monitors the state KA of the switch 20, and generates the event "short_press" with acquisition of information indicating that the switch 20 is pressed (on). Then, the operation information processing unit 41 generates the event "long_press" in a case where a time equal to or greater than the predetermined threshold elapses from when the switch 20 is pressed (on), and thereafter, generates the event "long_release" with acquisition of information indicating that the switch 20 is opened (off).

In detail, the event "short_press" is generated at a timing at which the state of the press in the switch 20 transits from "0" indicating that the switch is not pressed to "1" indicating that the switch is pressed. That is, "short_press" is generated at a timing of transition from a press state K11 to a press state K12 or at a timing of transition from a press state K21 to a press state K22.

The event "short_release" is generated at a timing at which the state of the press in the switch 20 transits from "1" to "0" for the time less than the predetermined threshold. That is, the event "short_release" is generated at a timing of transition from the press state K12 to a press state K13.

The event "long_press" is generated when an operation state in the switch 20 is continued to be "1" until the predetermined threshold elapses. That is, the event "long_press" is generated at a timing of transition from the press state K22 to a press state K23.

The event "long_release" is generated at a timing at which the operation state in the switch 20 transits from "1" to "0" after the predetermined threshold elapses. That is, the event "long_release" is generated at a timing of transition from the press state K23 to a press state K24.

Next, an example where each event generated according to the press M1 of the switch 20 is consumed will be described referring to FIGS. 4 and 5. An example where an event generated in a case where the first ECU 40 makes the monitor 30 display a screen is consumed will be described. That is, the priority of allocation of the operation information is set such that the priority of the first ECU 40 is the first and the priority of the second ECU 50 is the second. The operation information processing unit 41 of the first ECU 40 generates an event with the reception of the press information M2.

Figure 4:
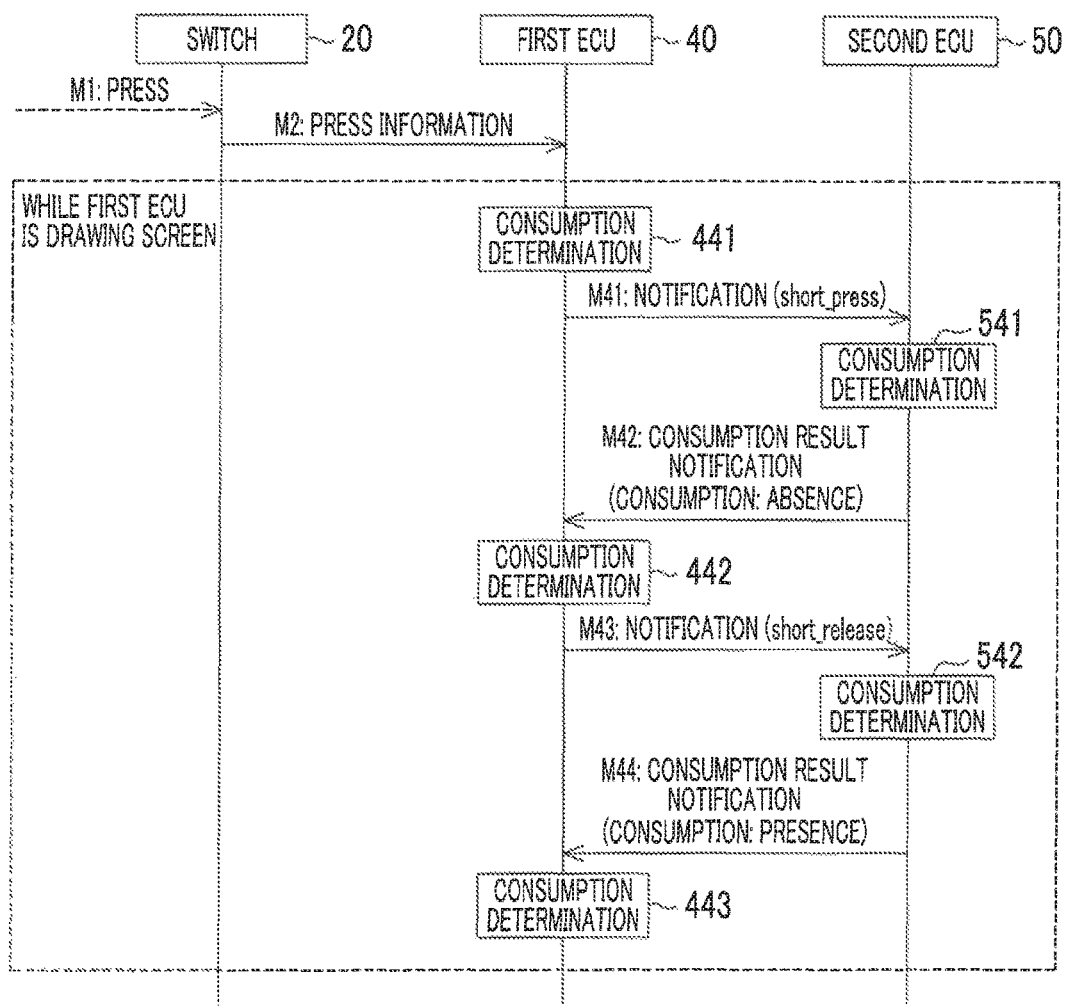
FIG. 4 is a sequence diagram showing an example of consumption of an event that is detected by short press.

FIG. 4 shows an example of the operation of the communication system in a case where the second ECU 50 that does not make a screen be displayed consumes the event "short_release". As shown in FIG. 4, the first ECU 40 receives the press information M2 corresponding to the press M1 of the switch 20. The first ECU 40 generates an event according to the press M1 of the switch 20 from the press information M2 received by the first ECU 40. In the example shown in the drawing, the first ECU 40 generates the events "short_press" and "short_release" according to "short_press" in this order.

First, the first ECU 40 generates the first event "short_press" and performs consumption determination 441 on the first event. In the consumption determination 441 that is performed by the first ECU 40, the first event is notified to the program that is executed by the first ECU 40 and handles a screen. In the notification, in a case where the program uses the first event, the first event is consumed. In a case where the program does not use the first event, the first event is not consumed. In the example shown in the drawing, since the first event is not consumed, in the consumption determination 441, the first ECU 40 determines that the first event is not consumed, The operation information transmission and reception unit 43 of the first ECU 40 transmits, to the second ECU 50, notification M41 including the first event "short_press" that is not consumed. The second ECU 50 acquires the first event "short_press". The second ECU 50 performs consumption determination 541 that is determination regarding whether or not the acquired event is consumed in the second ECU 50. In the consumption determination 541 that is performed by the second ECU 50, first, the first event is notified to the program that is executed by the second ECU 50 and handles a screen. In the notification, in a case where the program uses the first event, the first event is consumed. In a case where the program does not use the first event, the first event is not consumed in the example shown in the drawing, since the first event is not consumed, in the consumption determination 541, the second ECU 50 determines that the first event is not consumed. Then, the second ECU 50 notifies the first ECU 40 that the first event is not consumed, as consumption result notification M42 of the first event.

In a case where the consumption result notification M42 indicating that the first event is not consumed is received from the second ECU 50, the first ECU 40 discards the first event. Next, the first ECU 40 generates the second event "short_release", and as in the above-described case, performs consumption determination 442 on the second event. In the example shown in the drawing, since the second event is not consumed, in the consumption determination 442, the first ECU 40 determines that the second event is not consumed.

The first ECU 40 transmits notification M43 including the unconsumed second event to the second ECU 50. The second ECU 50 acquires the second event and performs consumption determination 542 that is determination regarding whether or not the second event is consumed in the second ECU 50. In the consumption determination 542 that is performed by the second ECU 50, first, the second event is notified to the program that is executed by the second ECU 50 and handles a screen. In the notification, in a case where the program uses the second event, the event is consumed. In a case where the program does not use the second event, the event is not consumed. Here, an example where the second event is consumed is shown, and in the consumption determination 542, the second ECU 50 determines that the second event is consumed. Then, the operation information transmission and reception unit 53 of the second ECU 50 transmits, to the first ECU 40, notification indicating that the event is consumed, as consumption result notification M44 of the event.

In a case where the consumption result notification M44 indicating that the second event is consumed is received from the second ECU 50, in consumption determination 443, the first ECU 40 ends the notification of the second event to other ECUs or the like than the first ECU 40.

Figure 5:
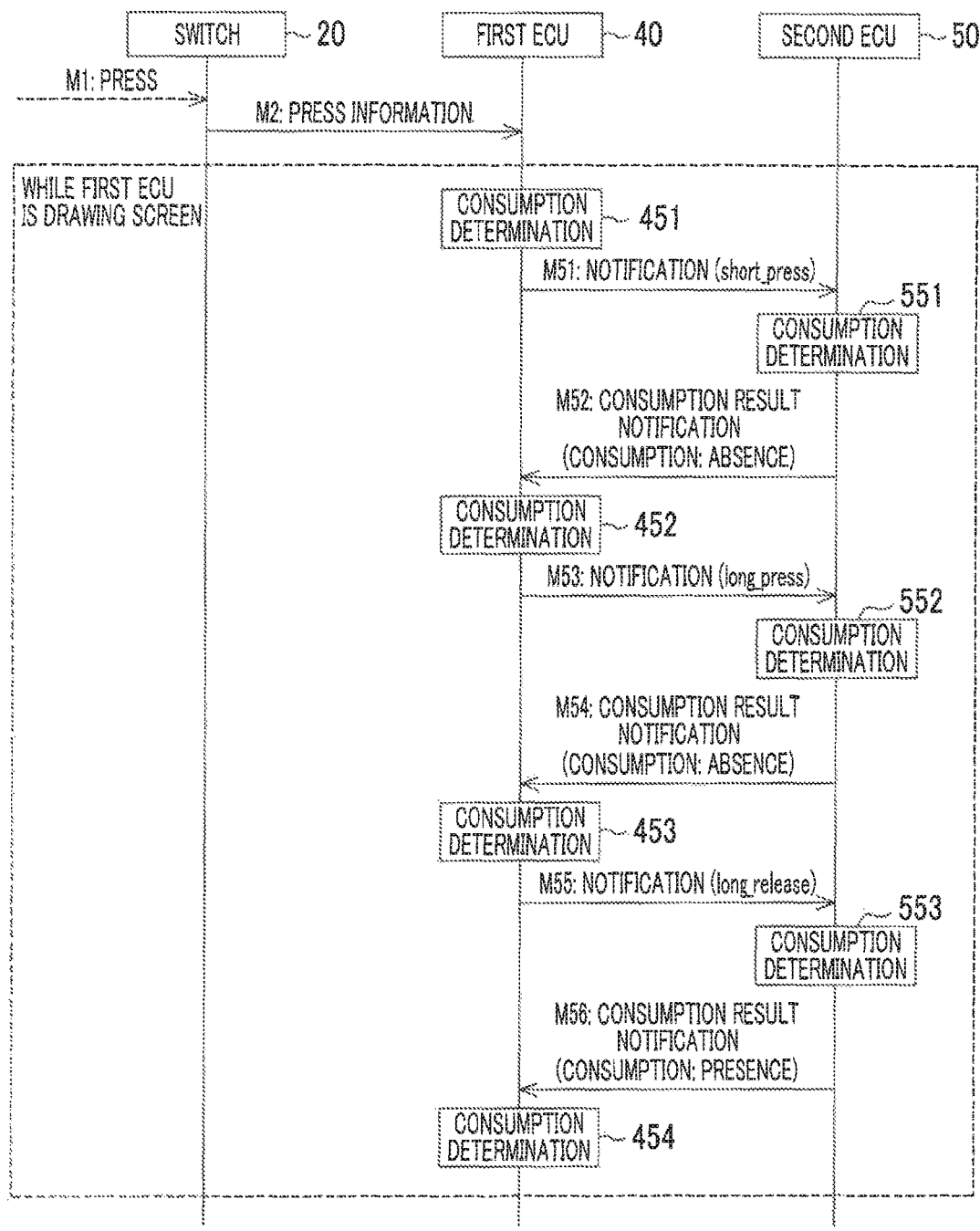
FIG. 5 is a sequence diagram showing an example of consumption of an event that is detected by long press.

FIG. 5 shows an example of the operation of the communication system in a case where the second ECU 50 that does not make a screen be displayed consumes "long_release". As shown in FIG. 5, the first ECU 40 generates an event according to the press M1 of the switch 20 from the press information M2 received by the first ECU 40. In the example shown in the drawing, "short_press", "long_press", and "long_release" that are events generated with "long_press" are generated in this order.

First, the first ECU 40 generates the first event "short_press", and as in the above-described case, performs consumption determination 451 on the first event. In the example shown in the drawing, since the first event is not consumed, in the consumption determination 451, the first ECU 40 determines that the first event is not consumed.

The first ECU 40 transmits notification M51 including the unconsumed first event "short_press" to the second ECU 50. The second ECU 50 acquires the first event "short press". As in the above-described case, the second ECU 50 performs consumption determination 551 regarding whether or not the first event is consumed in the second ECU 50. In the example shown in the drawing, since the first event is not consumed, in the consumption determination 551, the second ECU 50 determines that the first event is not consumed. Then, the second ECU 50 transmits, to the first ECU 40, notification indicating that the first event is not consumed, as consumption result notification M52 of the first event.

In a case where the consumption result notification M52 indicating that the first event is not consumed is received from the second ECU 50, the first ECU 40 discards the first event. Next, the first ECU 40 generates the second event "long_press", as in the above-described case, performs consumption determination 452 on the second event. In the example shown in the drawing, since the second event is not consumed, in the consumption determination 452, the first ECU 40 determines that the second event is not consumed.

The first ECU 40 transmits notification M53 including the unconsumed second event to the second ECU 50. The second ECU 50 acquires the second event, and the second ECU 50 performs determination regarding whether or not the second event is consumed in the second ECU 50 as in the above-described case. In the example shown in the drawing, since the second event is not consumed, in consumption determination 552, the second ECU 50 determines that the second event is not consumed. Then, the second ECU 50 transmits, to the first ECU 40, notification indicating that the second event is not consumed, as consumption result notification M54 of the second event.

In a case where the consumption result notification M54 indicating that the second event is not consumed is received from the second ECU 50, the first ECU 40 discards the second event. Subsequently, the first ECU 40 generates the third event "long_release", and as in the above-described case, performs consumption determination 453 on the third event. In the example shown in the drawing, since the third event is not consumed, in consumption determination 453, determination is made that the third event is not consumed.

The operation information transmission and reception unit 43 of the first ECU 40 transmits notification M55 including the unconsumed third event "long_release" to the second ECU 50. The second. ECU 50 acquires the third event "long_release". As in the above-described case, the second ECU 50 performs consumption determination 553 that is determination regarding whether or not the third event is consumed in the second ECU 50. In the example shown in the drawing, since the third event is consumed, in the consumption determination 553, the second ECU 50 determines that the third event is consumed. Then, the second ECU 50 transmits, to the first ECU 40, notification indicating that the third event s consumed, as consumption result notification M56 of the third event.

In a case where the consumption result notification M56 indicating that the third event is consumed is received from the second ECU 50, in consumption determination 454, the first ECU 40 ends the notification of the third event to other ECUs or the like than the first ECU 40.

Figure 6:
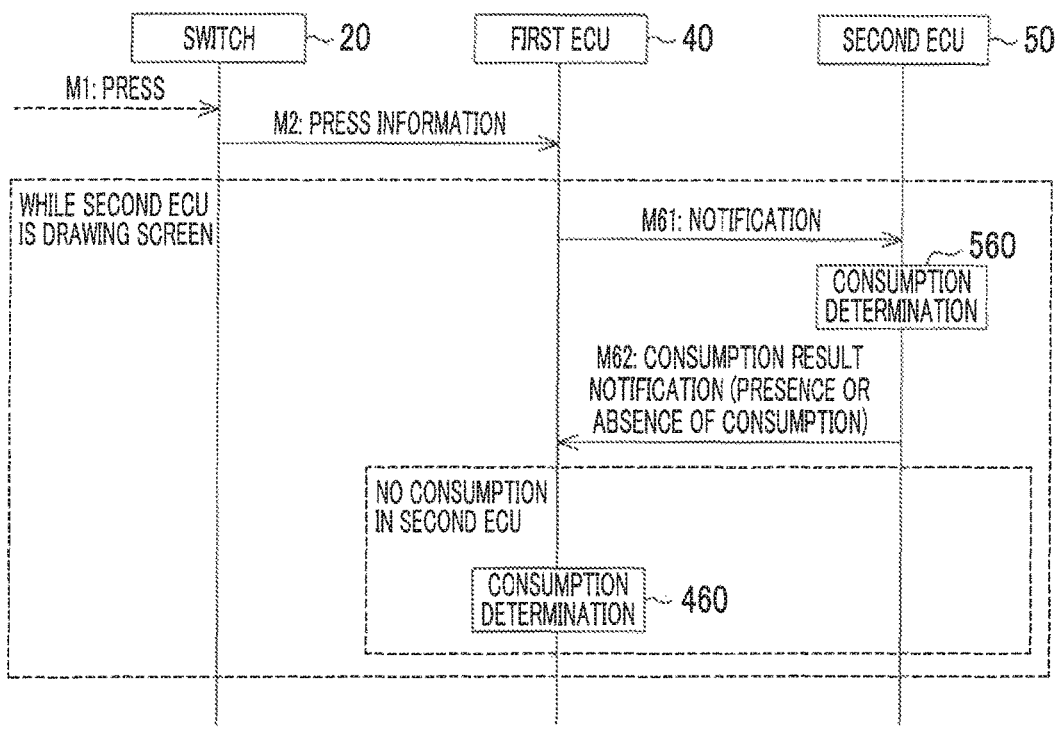
FIG. 6 is a sequence diagram showing an example where consumption determination of an event is performed from a second ECU.

Next, an example where an event generated in a case where the second. ECU 50 makes the monitor 30 display a screen is consumed will be described referring to FIG. 6. That is, the priority of allocation of the operation information is set such that the priority of the second ECU 50 is the first and the priority of the first ECU 40 is second.

The first ECU 40 receives the press information M2 corresponding to the press M1 of the switch 20. The first ECU 40 generates an event according to the press M1 of the switch 20 from the press information M2 received by the first ECU 40. The first ECU 40 transmits notification M61 including the event generated by the first ECU 40 to the second ECU 50 where the priority of allocation of the operation information is the first.

The second ECU 50 acquires the event corresponding to the press of the switch 20 from the notification M61 received by the second ECU 50. The second ECU 50 performs, as consumption determination 560, determination regarding whether or not the event acquired by the second ECU 50 is used in the program that is executed by the second ECU 50 and handles a screen. In the consumption determination 560, in a case where the acquired event is used in the program, the second ECU 50 determines that the event is consumed, and in a case where the event is not used in the program, the second ECU 50 determines that the event is not consumed. The second ECU 50 transmits, to the first ECU 40, a result of the determination regarding whether or not the event is consumed, as consumption result notification M62. The consumed event disappears when the event is consumed. The unconsumed event is transferred to another ECU having priority next to the second ECU 50.

The first ECU 40 receives the consumption result notification M62 transmitted from the second ECU 50. The first ECU 40 acquires the event corresponding to the press of the switch 20 from the consumption result notification M62 received by the first ECU 40. The first ECU 40 performs, as consumption determination 460, determination regarding whether or not the event acquired by the first ECU 40 is used in the program that is executed by the first ECU 40 and handles a screen. In the consumption determination 460, in a case where the acquired event is used in the program, the first ECU 40 determines that the event is consumed, and in a case where the event is not used in the program, the first ECU 40 determines that the event is not consumed. The consumed event disappears when the event is consumed. The unconsumed event is transferred to another ECU having priority next to the first ECU 40. In a case where there is no transfer destination of the event, the first ECU 40 may make the event disappear.

An example where each event generated according to the press M1 of the switch 20 is consumed will be described referring to FIGS. 7 and 8. An example where an event generated in a case where the second ECU 50 makes the monitor 30 display a screen is consumed will be described. That is, the priority of allocation of the operation information is set such that the second ECU 50 is the first and the first ECU 40 is the second. As in the above-described example, the operation information processing unit 41 of the first ECU 40 generates an event with the acquisition of the press information M2.

Figure 7:
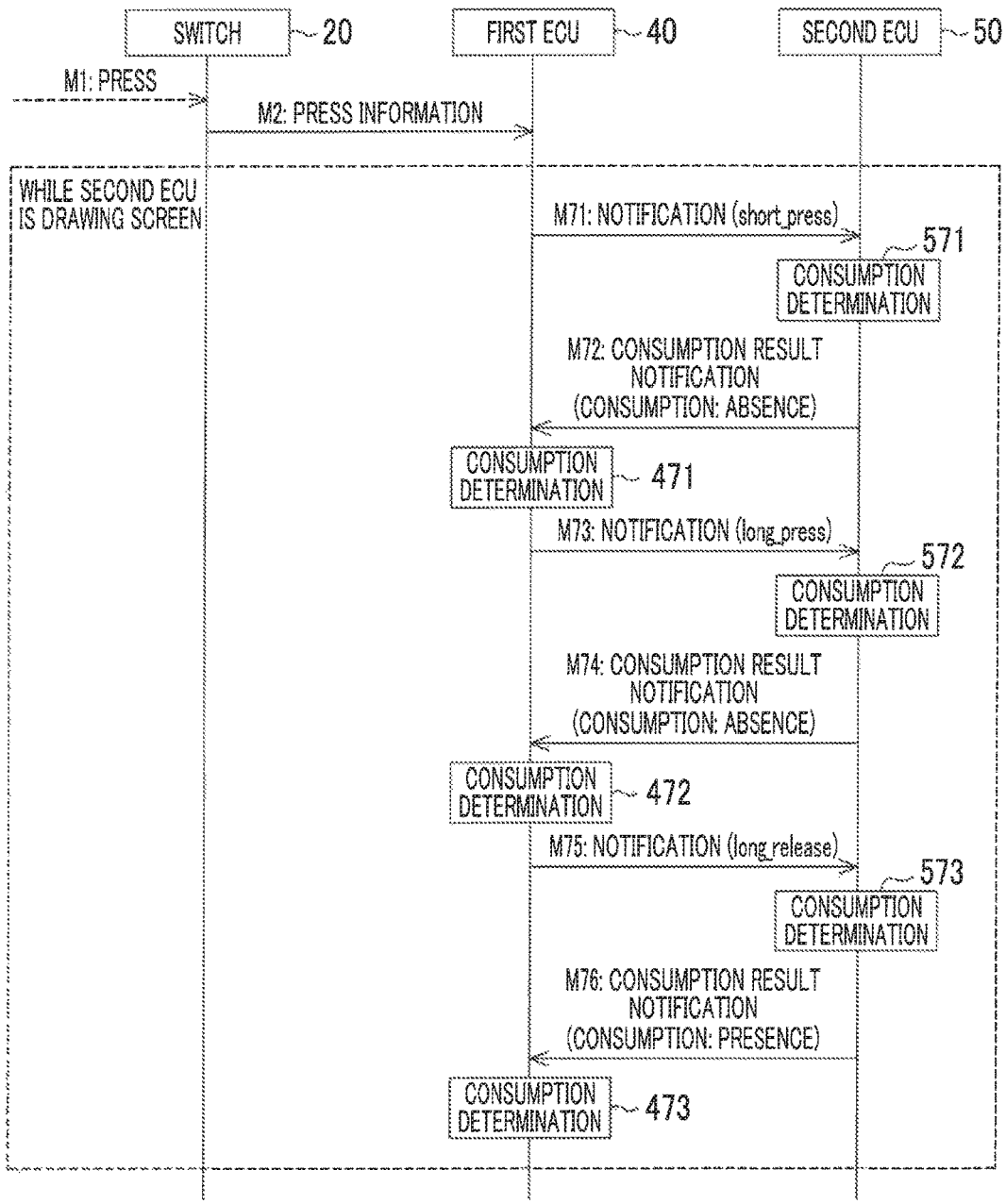
FIG. 7 is a sequence diagram showing an example of consumption of an event that is detected by short press.

FIG. 7 shows an example of the operation of the communication system in a case where the second ECU 50 that makes a screen be displayed consumes the event "long_release". As shown in FIG. 7, the first ECU 40 receives the press information M2 corresponding to the press M1 of the switch 20. The first ECU 40 generates an event according to the press M1 of the switch 20 from the press information M2 received by the first ECU 40. In the example shown in the drawing, the first ECU 40 generates "short_press", "long-press", and "long_release" that are events according to "long_press".

First, the first ECU 40 generates the first event "short press" and transmits notification M71 including the first event to the second ECU 50. The second ECU 50 performs consumption determination 571 on the first event "short_press". In the consumption determination 571 that is performed by the second ECU 50, first, the first event is notified to the program that is executed by the second ECU 50 and handles a screen. In the example shown in the drawing, since the first event is not consumed, in the consumption determination 571, the second ECU 50 determines that the first event is not consumed. Then, the second ECU 50 notifies the first ECU 40 that the first event is not consumed, as consumption result notification M72 of the first event, In a case where the consumption result notification M72 indicating that the first event is not consumed is received from the second ECU 50, the first ECU 40 performs consumption determination 471 on the first event. In the consumption determination 471 that is performed by the first ECU 40, first, the first event is notified to the program that is executed by the first ECU 40 and handles a screen. In the example shown in the drawing, since the first event is not consumed, in the consumption determination 471, the first ECU 40 determines that the first event is not consumed. Then, since there is no transfer destination of the first event, the first ECU 40 ends the notification to other ECUs or the like and discards the first event.

Next, the first ECU 40 generates the second event "long_press" and transmits notification M73 including the second event to the second ECU 50. The second ECU 50 acquires the second event, and as in the above-described case, performs consumption determination 572 on the second event. In the example shown in the drawing, since the second event is also not consumed, in the consumption determination 572, the second ECU 50 determines that the second event is not consumed. Then, the second ECU 50 transmits, to the first ECU 40, notification indicating that the second event is not consumed, as consumption result notification M74 of the second event.

In a case where the consumption result notification M74 indicating that the second event is not consumed is received from the second ECU 50, as in the above-described case, the first ECU 40 performs consumption determination 472 on the second event. In the example shown in the drawing, since the second event is not consumed, in the consumption determination 472, the first ECU 40 determines that the second event is not consumed. Then, since there is no transfer destination of the second event, the first ECU 40 ends the notification to other ECUs or the like and discards the second event.

Subsequently, the first ECU 40 generates the third event "long_release", and as in the above-described case, transmits notification M75 including the third event to the second ECU 50.

The second ECU 50 acquires the third event "long_release". As in the above-described case, the second ECU 50 performs consumption determination 573 on the third event. In the example shown in the drawing, since the third event is consumed, in the consumption determination 573, the second ECU 50 determines that the event is consumed. Then, the second ECU 50 transmits, to the first ECU 40, notification indicating that the third event is consumed, as consumption result notification M76.

In a case where the consumption result notification M76 indicating that the third event is consumed is received from the second ECU 50, the first ECU 40 performs consumption determination 473 on the third event. Since the third event is consumed in the second ECU 50, in the consumption determination 473, the first ECU 40 determines that the event is consumed, without giving notification of the third event to the program that is executed by the first ECU 40 and handles a screen. Then, since there is no transfer destination of the third event, the first ECU 40 ends the notification to other ECUs or the like.

Figure 8:
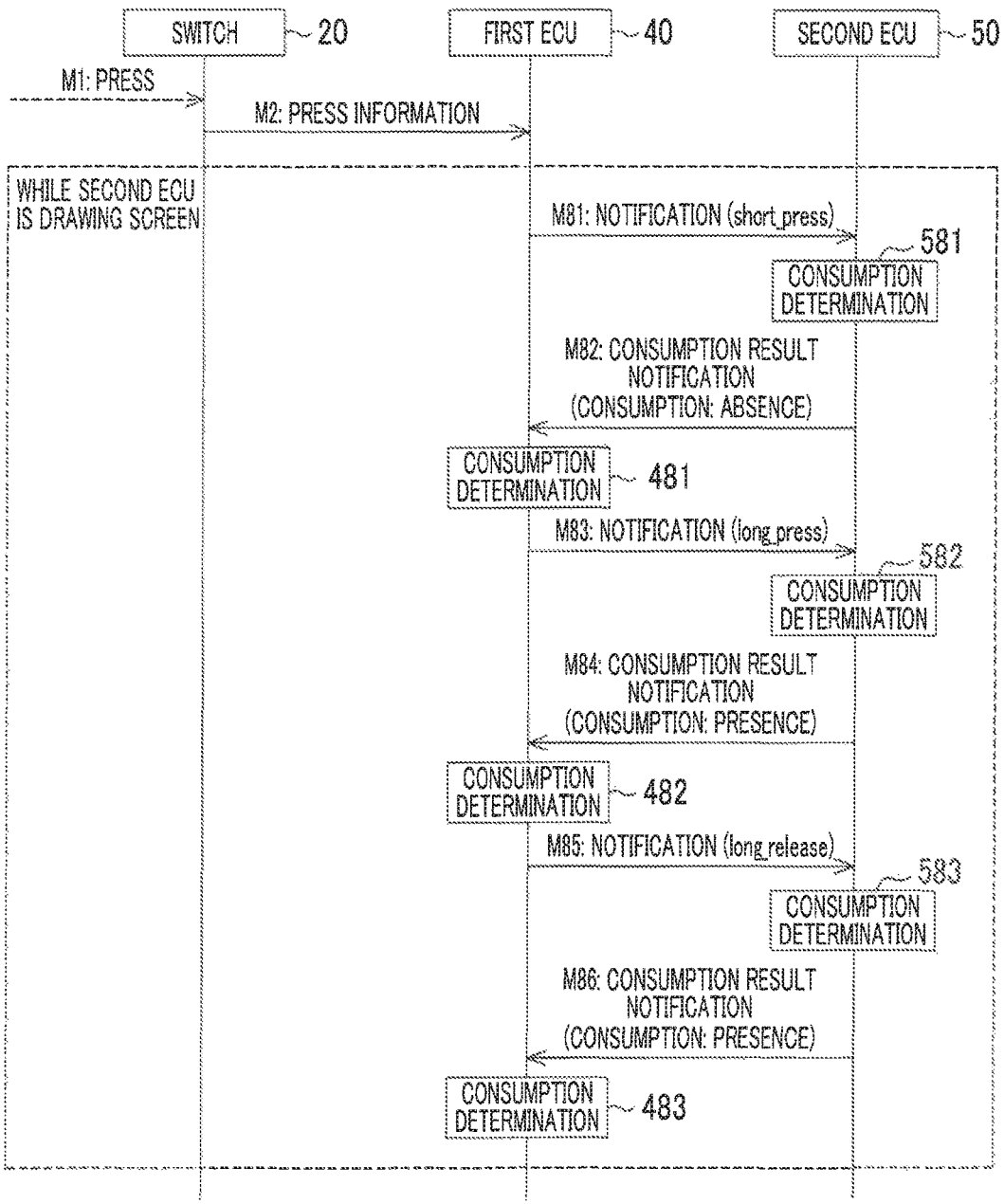
FIG. 8 is a sequence diagram showing an example of consumption of an event that is detected by long press.

FIG. 8 shows an example of the operation of the communication system in a case where the second ECU 50 that makes a screen be displayed consumes the event "long_press". The example that is described referring to FIG. 8 and the example that is described referring to FIG. 7 are different from each other in determination regarding whether or not the second event is consumed in the second ECU 50.

As shown in FIG. 8, the first ECU 40 receives the press information M2 corresponding to the press M1 of the switch 20, and generates an event according to the press M1 of the switch 20. In the example shown in the drawing, the first ECU 40 generates, in this order, "short_press", "long_press", and "long_release" that are events according to "long press".

First, the first ECU 40 generates the first event "short_press" and transmits notification M81 including the first event to the second ECU 50. As in the above-described case, the second ECU 50 performs consumption determination 581 on the first event "short_press". In the example shown in the drawing, since the first event is not consumed, in the consumption determination 581, the second ECU 50 determines that the first event is not consumed. Then, the second ECU 50 notifies the first ECU 40 that the first event is not consumed, as consumption result notification M82 of the first event.

In a case where the consumption result notification M82 indicating that the first event is not consumed is received from the second ECU 50, as in the above-described case, the first ECU 40 performs consumption determination 481 on the first event. In the example shown in the drawing, since the first event is not consumed, as the consumption determination 481, the first ECU 40 determines that the event is not consumed. Then, since there is no transfer destination of the first event, the first ECU 40 ends the notification to other ECUs or the like and discards the first event.

Next, the first ECU 40 generates the second event "long_press" and transmits notification M83 including the second event to the second ECU 50. The second ECU 50 acquires the second event, and as in the above-described case, performs consumption determination 582 on the second event. In the example shown in the drawing, since the second event is consumed, in the consumption determination 582, the second ECU 50 determines that the second event is consumed. Then, the second ECU 50 notifies the first ECU 40 that the second event is consumed, as consumption result notification M84 of the second event.

In a case where the consumption result notification M84 indicating that the second event is consumed is received from the first ECU 40, as in the above-described case, the first ECU 40 performs consumption determination 482 on the second event. In the example shown in the drawing, since the second event is consumed, in the consumption determination 482, the first ECU 40 determines that the second event is consumed, without giving notification of the second event to the program that is executed by the first ECU 40 and handles a screen. Then, the first ECU 40 ends the notification of the second event to other ECUs or the like.

Subsequently, the first ECU 40 generates the third event "long_release" and transmits notification M85 including the third event to the second ECU 50. The second ECU 50 acquires the third event "long_release". As in the above-described case, the second ECU 50 performs consumption determination 583 on the third event. In the example shown in the drawing, since the second event is consumed, in the consumption determination 583, the second ECU 50 determines that the third event is consumed, without notification of the third event to the program that is executed by the second ECU 50 and handles a screen. Then, the second ECU 50 transmits, to the first ECU 40, notification indicating that the third event is consumed, as consumption result notification M86.

In a case where the consumption result notification M86 of the event indicating that the event is consumed is received from the second ECU 50, as in the above-described case, the first ECU 40 performs consumption determination 483 on the third event. Since the event is consumed, in the consumption determination 483, the first ECU 40 determines that the event is consumed, without notification of the third event to the program that is executed by the first ECU 40 and handles a screen. Then, the first ECU 40 ends the notification of the third event to other ECUs or the like.

As described above, according to the display system, the following effects are obtained. (1) An ECU that makes the monitor 30 display a screen performs determination regarding whether or not a generated event is used in the ECU, with priority over other ECUs. As a result, it is possible to easily specify a processing destination of the event out of a plurality of ECUs 40, 50. Furthermore, it is possible to suppress concentration on one ECU of the determination regarding whether or not the generated event is used in the ECU.

(2) In addition, it is possible to increase a speed of specifying compared to a configuration in which the determination regarding whether or not the generated event is used in an ECU is performed on all events in order from a specific ECU.

(3) As long as a specific ECU ascertains all events that are generated by operations, an ECU that processes the event is specified for each generated event, and the event is notified to the specific ECU, whereby a load of processing is concentrated on the specific ECU. From this, in a configuration hi which each of the first ECU 40 and the second ECU 50 determines whether or not the generated event is used in the ECU, it is possible to further suppress concentration on the specific ECU of the load of processing.

(4) Since an event is included in the consumption result notification indicating that the event is not consumed, when the notification is received, the first ECU 40 can receive an event to be determined in the first ECU 40 from the second ECU 50. For this reason, the first ECU 40 can reduce a load of the first ECU 40 separately managing an event that the second ECU 50 determines as not being used therein, that is, an event that is transmitted from the first ECU 40 to the second ECU 50 early.

(5) The consumption determination on the event is performed in order in each ECU according to the priority set in advance. For this reason, in a configuration in which a plurality of second ECUs 50 is provided, it is possible to increase the speed of processing for determining an ECU that has the event as a processing target.

(6) Since a plurality of events according to the press M1 of the switch 20 is generated from the press information M2 received by the first ECU 40, it becomes easy to cope with each press method, such as "short_press" or "long_press".

The embodiment can be carried out in the following forms.

Operation Device

In the embodiment, a configuration in which the processing for generating an event corresponding to an operation of the switch 20 is performed in the operation information processing unit 41 has been illustrated. The disclosure is not limited thereto, and an event corresponding to an operation of the switch 20 may be generated by the switch 20. In this case, the event corresponding to the operation of the switch 20 is included in the press information that is an example of the operation information and transmitted to the first ECU 40.

In the embodiment, a configuration in which the input device is the switch 20 has been illustrated. The disclosure is not limited thereto, and the input device may be a device, such as a key, such as a keyboard, a button, or a mouse, configured to be operable by the driver or the like. At this time, a configuration may be made in which the communication system generates an event corresponding to an operation of each input device.

Event

In the embodiment, a configuration in which the two events relating to "short_press" or the three events relating to "long_press" are generated from the press information M2 has been illustrated. The disclosure is not limited thereto, and as long as one piece of press information M2 corresponds to one event, a configuration in which one event is generated with acquisition of the press information M2 in the first ECU 40 can be employed in the communication system.

An event alone or four or more events may be generated from the press information M2.

When the press information M2 is received, the first ECU 40 may generate events "press" and "release" and may transmit notification including the event to the second ECU 50. At this time, the second ECU 50 may determine any operation of "short_press" and "long_press" based on comparison of the time of the press based on "press" and "release" with a predetermined threshold.

In the embodiment, a case where the program that handles a screen in the first ECU 40 is one has been illustrated. The disclosure is not limited thereto, and a plurality of programs that handles a screen in the first ECU 40 may be provided. In this case, in the first ECU 40, a configuration in which an event is transferred to each program in an order of priority may be made.

In the embodiment, a configuration in which the second ECU 50 returns the unconsumed event to the first ECU 40 and transmits the unconsumed event to the first ECU 40 along with the consumption result notification M22 has been illustrated. The disclosure is not limited thereto, and the first ECU 40 stores a copy of an event and the second ECU 50 transmits the consumption result notification M22 alone. Then, the first ECU 40 may determine the transmission or discarding of the event stored in the first ECU 40.

In the embodiment, the display system may include a setting unit that sets an order of allocation of the operation information. The setting unit sets the order of allocation of the operation information in advance such that, for example, an ECU where an event is relatively highly likely to be consumed has relatively high priority or such that an ECU where a frequency of displaying a screen is relatively high has relatively high priority.

Others

In the embodiment, a case where the communication protocol is the CAN protocol has been illustrated. However, the disclosure is not limited thereto, and as long as a message counter is used for securing reliability of a communication message, the communication protocol may be a protocol other than the CAN protocol, for example, a communication protocol, such as Ethernet (Registered Trademark) or FlexRay (Registered Trademark).

What is claimed is:

1. A display system comprising:
a display device configured to display a screen; and
a plurality of electronic control units connected to a communication network, the electronic control units being configured to make the display device display the screen, wherein;
the electronic control units include a first electronic control unit and a second electronic control unit;
each of the electronic control units is configured to perform determination regarding whether or not operation information about the screen is a processing target of the electronic control unit, when the operation information is a processing target, perform control based on the operation information, and when the operation information is not a processing target, transmit, to other electronic control units, notification that the operation information is not a processing target as processing after the determination;
the first electronic control unit is configured to acquire operation information on the screen;
the first electronic control unit is configured to perform the determination on the operation information when the first electronic control unit makes the screen be displayed, in a case where the operation information is not a processing target of the first electronic control unit, set a transmission destination of the notification in the processing after the determination to the second electronic control unit and include the operation information in the notification, and when the second electronic control unit makes the screen be displayed, transmit the operation information to the second electronic control unit before the determination is performed; and
the second electronic control unit is configured to perform the determination and the processing after the determination on the operation information received from the first electronic control unit.

2. The display system according to claim 1, wherein the second electronic control unit is configured to set the transmission destination of the notification in the processing after the determination to the first electronic control unit, and the first electronic control unit is configured to, when the notification is received from the second electronic control unit, perform the determination and the processing after the determination on the operation information transmitted before the determination is performed.

3. The display system according to claim 1, wherein the second electronic control unit is configured to perform the determination on the operation information transmitted before the first electronic control unit performs the determination, when the operation information is not a processing target of the second electronic control unit, set the transmission destination of the notification in the processing after the determination to the first electronic control unit, and transmit the operation information included in the notification to the first electronic control unit.

4. The display system according to claim 1, wherein the electronic control units include the first electronic control unit and a plurality of second electronic control units, an order of transmission of the notification is set in advance to each of the electronic control units, and the notification in the processing after the determination including the operation information is transmitted according to the order to the electronic control units other than the electronic control unit that makes the screen be displayed.

5. The display system according to claim 1, wherein the first electronic control unit is configured to generate a plurality of events upon reception of a result of an operation on the screen from an input device and handle each event as the operation information.

6. The display system according to claim 1, wherein an input device that is provided to input the operation information is a switch.

7. The display system according to claim 6, wherein the first electronic control unit is configured to generate an event according to a length of a time for pressing the switch.

* * * * *